Aug. 16, 1966  P. T. SEPHTON ETAL  3,266,615
UNSCRAMBLING DEVICE
Filed May 11, 1965  6 Sheets-Sheet 5
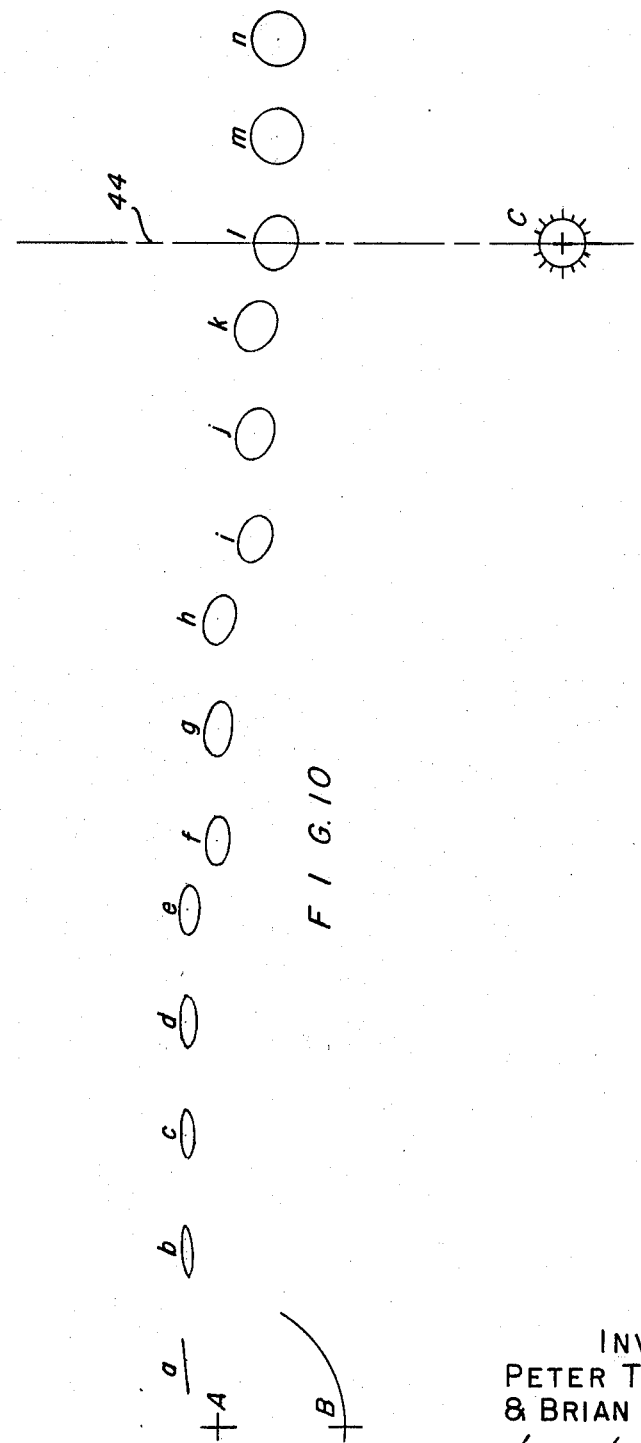
INVENTORS
PETER T. SEPHTON
& BRIAN R. RIDEN
BY Smart & Biggs
ATTORNEYS.

FIG. 11, FIG. 11A, FIG. 11B, FIG. 11C, FIG. 11D, FIG. 11E, FIG. 11F
FIG. 12, FIG. 12A, FIG. 12B, FIG. 12C, FIG. 12D, FIG. 12E, FIG. 12F

INVENTORS
PETER T. SEPHTON
& BRIAN R. RIDEN
ATTORNEYS.

United States Patent Office 3,266,615
Patented August 16, 1966

3,266,615
UNSCRAMBLING DEVICE
Peter T. Sephton and Brian R. Riden, Pierrefonds, Quebec, Canada, assignors to Canada Iron Foundries, Limited, Montreal, Quebec, Canada
Filed May 11, 1965, Ser. No. 454,816
15 Claims. (Cl. 198—34)

The present invention relates to an unscrambler device and in particular to an unscrambler device for selecting any desired number of articles from a plurality thereof and discharging said selected articles therefrom. The present invention has particular application to the unscrambling of bundles of bars, e.g., steel bars and billets and the discharging thereof from the device for further operations.

In the production thereof, steel bars or billets on emission from the rolling mill are heaped into piles and bundles. Each of these bundles or piles is formed from a large number of such bars or billets which are usually in a completely random operation, i.e., they are in a scrambled condition. For further operations on these bars or billets such as inspection or scarfing it is necessary to unscramble the piles or bundles such that the bars or billets are removed desirably one at a time therefrom and discharged at the place where the further operation is to take place. However, due to the weight of the steel bars or billets and their considerable length, manual unscrambling thereof is a difficult and dangerous operation.

United States Patent No. 2,995,235 discloses and claims an apparatus for unscrambling separating bars or billets which comprises spaced pairs of horizontal rails each having a series of substantially "V" shaped notches of progressively decreasing depth and width from the charging to the discharging end thereof the notches on one rail of each pair being staggered in relation to the notches on the other rail of said pair, means being provided for moving the rails of each pair up and down only relative to each other so as to move the bars in progressively decreasing quantities through notches of progressively decreasing depth and width and discharging them one at a time from the discharging end of the rails, the bars being moved through the notches and discharged from the rails solely by the relative up and down movement of the rails.

Although the apparatus of the United States patent should theoretically be capable of selecting one bar from a plurality thereof in actual practice more than one bar will frequently be delivered from the discharge end of the apparatus. Thus the apparatus relies for its selection on the decreasing size of the notches on the rails and the forward movement of the bars from the charging to the discharging end of the rail is only provided by the inclined surfaces of the notches on the rails there being no forward motion provided by the movement of the rails which is purely in a vertical direction. As a result the bars in falling down the slopes of the notches on the rails have a tendency to bridge the notches on the rails and any particular notch may therefore quite easily hold more bars than that for which it was designed. As will be readily apparent there is no positive action with the apparatus of the United States patent to ensure that only the intended number of bars are held in any particular notch as the moveable rails only move in a vertical plane and do not impart any horizontal movement to the bars.

The present invention provides an unscrambler device in which the desired number of bars in particular a single bar is selected from bundles thereof and discharged regularly from the device. The present invention also provides in such an unscrambling device a means whereby there is a positive lifting and positioning of the bars to be unscrambled from the charging end to the discharging end and therefore eliminates any possibility of the uncorrected number of bars being held by any particular tooth. In particular the present invention provides an unscrambling device in which the moveable beam is a walking beam which desides having a vertical motion also has a horizontal motion so that the moveable beam will lift the bars, carry them forward and deposit the bars on fixed beams and as such the selection of the bars in such a movement is positive and determined primarily by the dimensions and configuration of the tooth on the moveable beam.

According to the present invention therefore there is provided an unscrambler device for obtaining a desired number of articles from a plurality thereof which comprises a pair of spaced fixed beams having the upper surfaces thereof in essentially the same horizontal plane and a walking beam adjacent said fixed beams mounted at the downstream end thereof for gyration in a vertical plane such that on gyration of said end the upper surface of the walking beam rises above and descends below the upper surfaces of the fixed beams so as to move articles disposed on said fixed beams along said beams, means for gyrating the downstream end of said walking beam, each of said walking and fixed beams being provided on the upper surface with a cascade ending in a reverse slope forming a valley whereby at least one of the articles disposed in the valley on the fixed beams is picked up and carried in the valley on the walking beam and deposited on the downstream portion of the fixed beams, means being provided for moving further articles into the valley of the fixed beam. In a preferred embodiment of the present invention the articles adjacent and upstream of the valley on the fixed beam are moved into said valley so, by the movement of the walking beam this being effected by forming a longer cascade on the walking beam than the cascade on the fixed beam. Thus besides picking up the article in the valley on the fixed beam the moveable beam at the same time picks up articles upstream of the valley on the fixed beam and deposits them in the valley on the fixed beam.

The provision of only a single valley on the fixed and moveable beams restricts the unscrambling capacity of the device, particularly when it is intended to use the device to obtain only a single article from a plurality thereof, to a particular size of article which is determined by the size and configuration of the valley on the fixed and moveable beams. In order to enhance the versatility of the device so as to be utilisable in unscrambling bundles of articles of various sizes it is desirable that the fixed and moveable beams are provided with a second valley which is formed by making the reverse slope of the first valley into an upstream slope of a tooth, the downstream slope of which ends in a reverse slope. The length of the downstream slope of the tooth in the second valley is desirably less than the length of the cascade on the fixed beam whereby a smaller number of articles may be selected than are accommodated in the fixed beam cascades. By this means the first valley forms a primary selection of the articles from the bundle and the second valley forms a further selection of the articles from the primary selection. Particularly desirably when dealiing with conventional 2" and 4" steel billets, the downstream slope is less than half the length of the cascades on the fixed beams. In practice the fixed and moveable beams have a plurality of such teeth which may effect further selection of the articles.

The motion of the walking beam, i.e., the gyration of the downstream end thereof in a vertical plane is suitably effected by means of an eccentrically mounted crankshaft driven by a motor. The upstream end of the walking beam is preferably suspended for oscillation in a plane inclined at an acute angle in downstream direction to the surfaces of the fixed beam. Suitably this is effected by suspending the upstream end of the walking beam by means of a linkage connected between a horizontal shaft mounted between the fixed beams and the lower portion of the upstream end of said walking beam. Desirably there are at least two of such walking beams harnessed together usually by means of a spacer so as to act in unison for moving the bars along the fixed beams.

The present invention will be further illustrated by way of the accompanying drawings in which:

FIGURES 7, 8 and 9 are fragmentary side elevations of the left hand end of a fixed and walking beam unit showing the cycle through which the bars are moved to deposit them one at a time in successive order upon the conveyor; and FIGURE 10 which shows a diagrammatic plot of the orbits of the points taken on the working surface of the walking beam of the unscrambler.

FIGURES 11 through 11F and FIGURES 12 through 12F show diagrammatically the sequence through which the respective billets are segregated and moved along the toothed portions of the fixed and walking beams at the delivery end. The diagrams also show the manner in which the respective beams 10 and 11 are notched to form and maintain the most efficient segregation during transportation along the delivery end of the beams.

Figure 1:
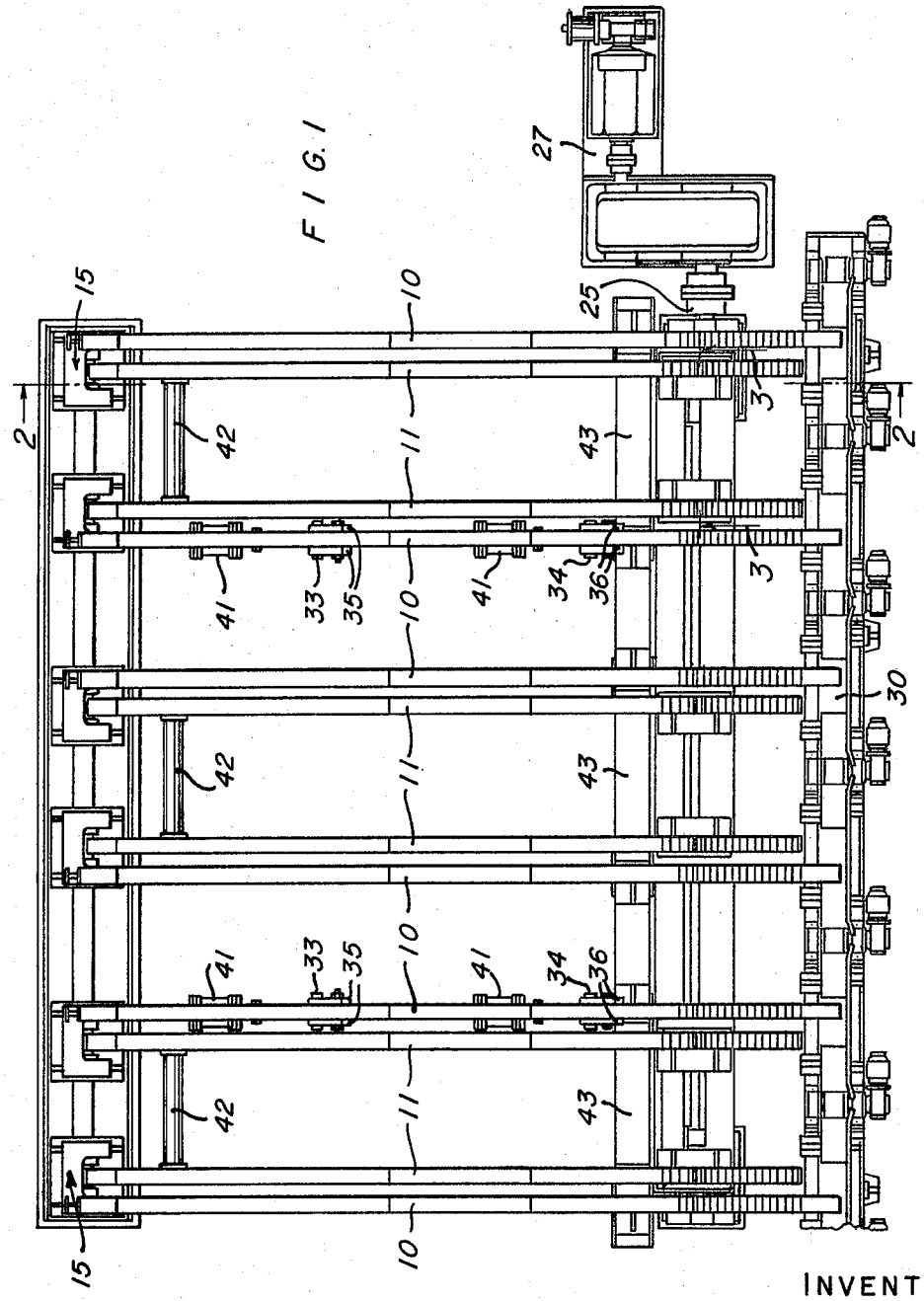
FIGURE 1 is a top plan view of the unscrambler.

As shown in FIGURE 1, the unscrambler consists of a plurality of fixed and walking beams 10 and 11 respectively mounted in spaced relationship upon a base 12. The base 12 as shown in FIGURE 3 is provided with pedestals 13 and 14 upon which are supported and anchored the fixed beams 10. The fixed beams are provided, at their receiving end, with a cranked portion 15 which has formed therein bores 16 (see FIGURE 5) adapted to receive and support shafts 17. Rotatably mounted upon and suspended downwardly from shafts 17 are spaced links 18. Adjacent their lower extremities the links 18 are pierced by bores 19 and provided with bearings in which rotatably mounted shafts 20 are received. The walking beams 11, at the end adjacent to the cranked portion 15 of beam 10, are provided with bores 21 through which the shaft 20 passes and is rigidly secured thereto in order to suspend the walking beams 11 intermediate to the links 18. The walking beams 11 (see FIGURES 2 and 5) are notched at 22 to permit the beams and links to oscillate about the shafts 17 without fouling thereon for reasons which will be apparent as the description hereinafter proceeds. The opposite ends of the walking beams 11 have secured on their lower surface downwardly projecting pedestals 23 which have secured thereon split bearings 24 which are adapted to be rotatably secured on spaced aligned cranked portions of shaft 25 (see FIGURES 4, 7, 8 and 9). The shaft 25 adjacent each cranked portion is mounted for rotation in bearing blocks 26 secured to the base 12. The shaft 25, at the right-hand end of FIGURE 1 is coupled to and driven by a drive train 27.

Figure 2:
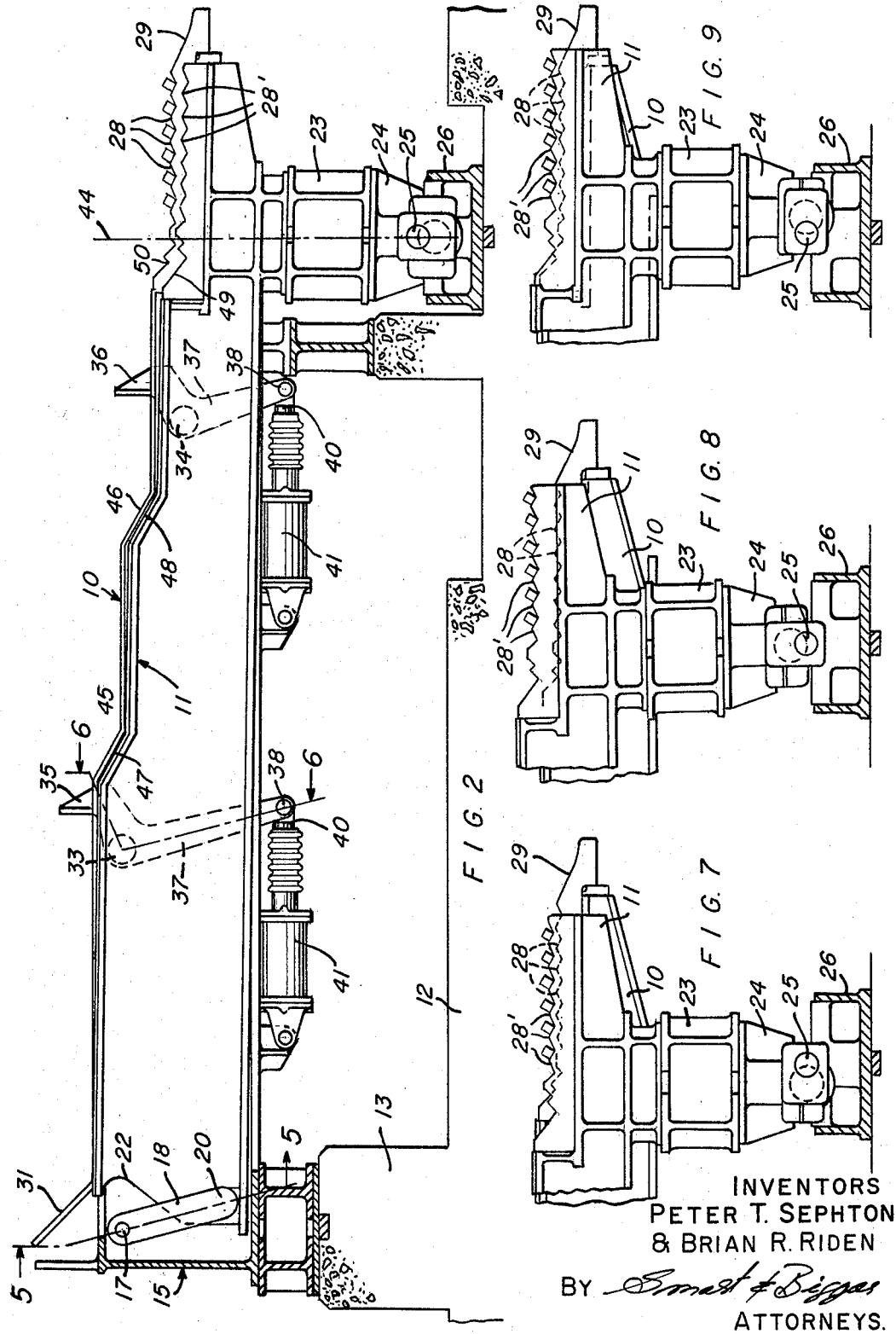
FIGURE 2 is a side elevation of a fixed and walking beam unit of the unscrambler as viewed on the line 2—2 of FIGURE 1.
Figure 3:
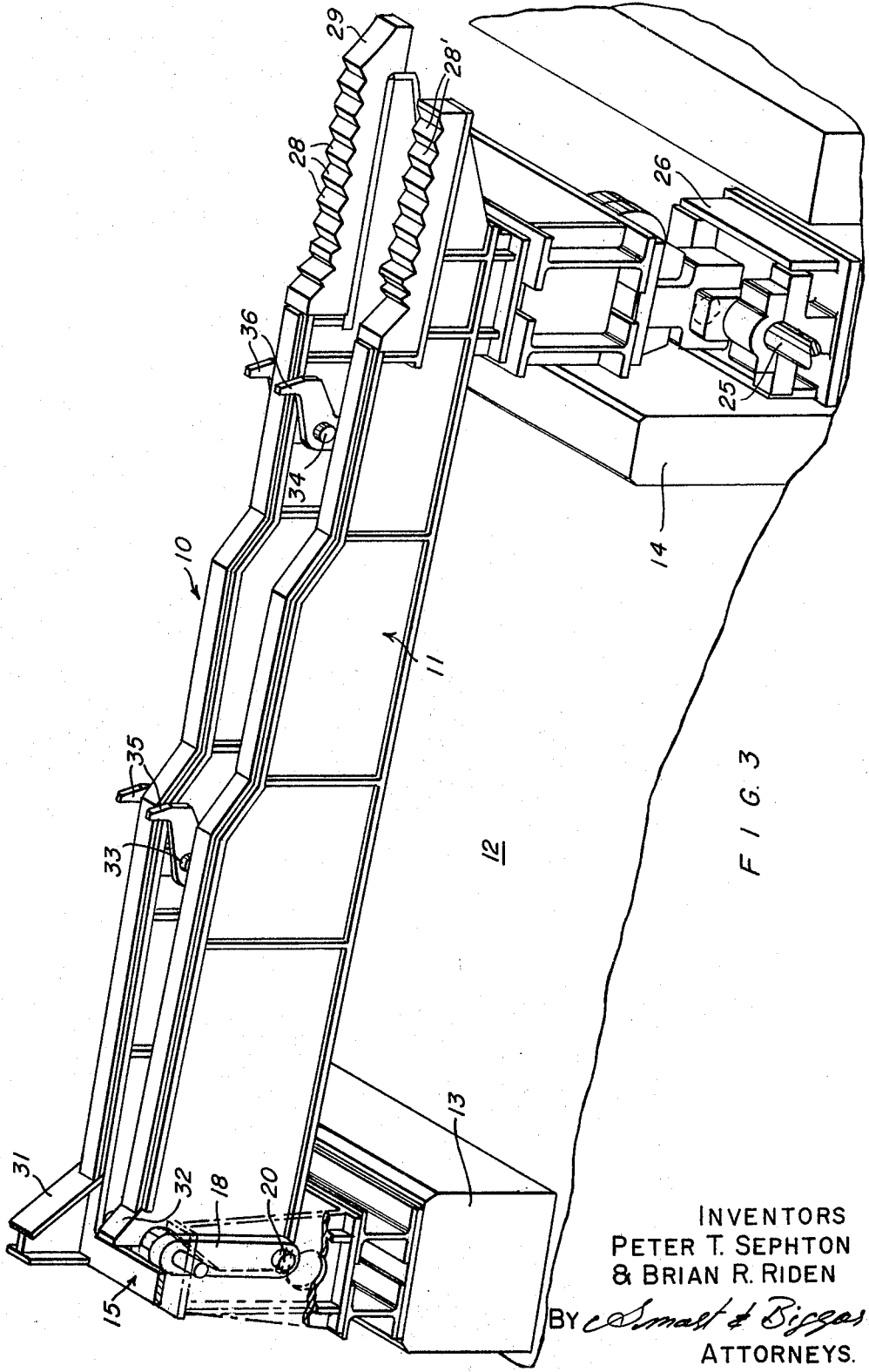
FIGURE 3 is a pictorial view of a fixed and walking beam unit also viewed on the line 2—2 of FIGURE 1.
Figure 4:
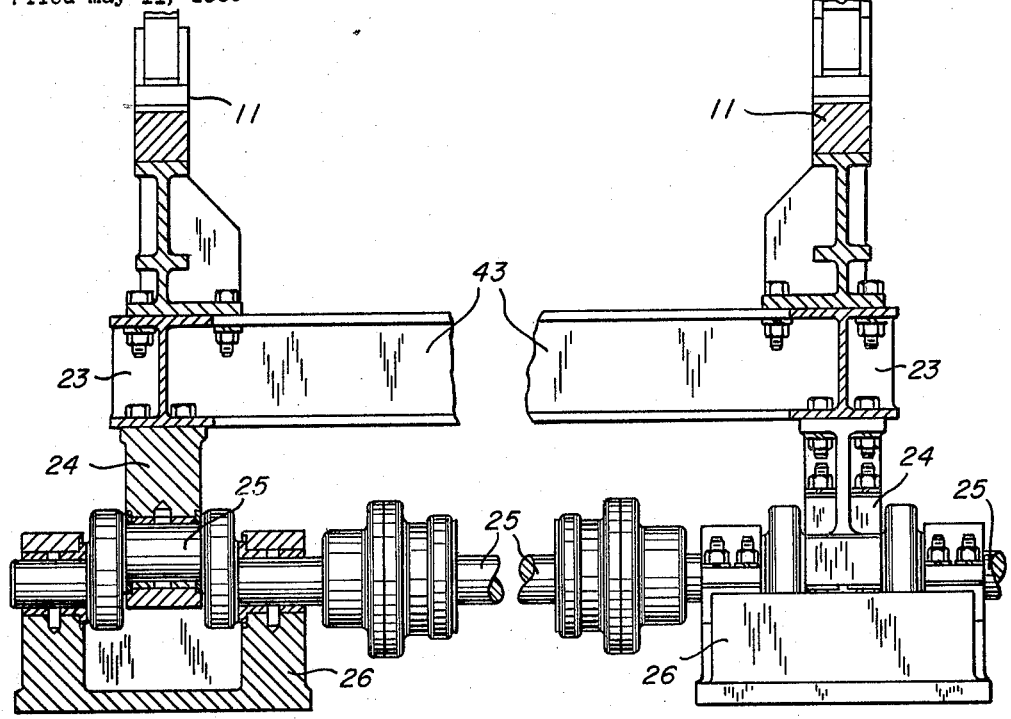
FIGURE 4 is a transverse sectional elevation taken on the line 3—3 of FIGURE 1 showing the means for oscillating the walking beams.
Figure 5:
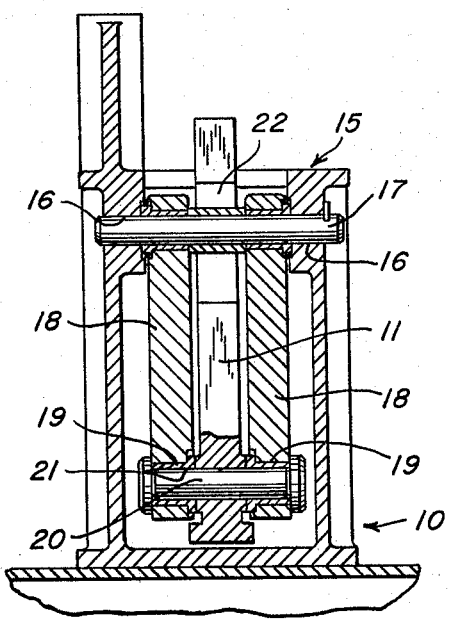
FIGURE 5 is a transverse sectional elevation taken on the line 5—5 of FIGURE 2.
Figure 6:
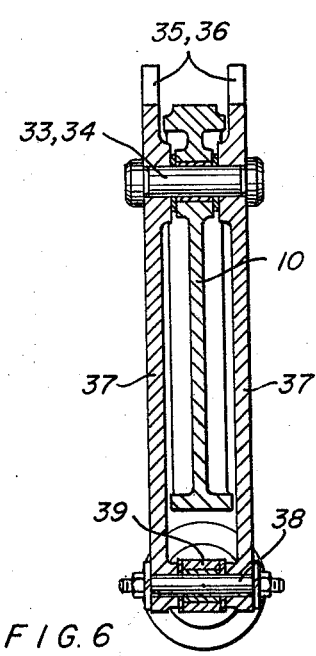
FIGURE 6 is a sectional elevation taken on the line 6—6 of FIGURE 2 showing the arresting dogs mounted upon the fixed beams.

The upper surface of the fixed and walking beams 10 and 11 are terraced in a downward direction from the receiving end to the delivery end as seen in FIGURES 1 and 2. The lowermost land of the terrace is corrugated transversely to form V-notched members 28 and 28'. The notched portions 28 of the fixed beams terminate in a downwardly inclined nose 29 which projects beyond the extremities of the walking beams to provide a portion that overhangs a conveyor 30. To prevent the billets or other articles placed upon the unscrambler from falling overboard at the receiving end, the fixed and walking beams 10 and 11 are provided with upwardly and rearwardly sloping buttresses 31 and 32 respectively. The buttress 31 extending upwardly to a greater extent than the buttress 32 (FIGURE 3). Adjacent the termination of the first and third lands of the terracing of the fixed beams there is rotatably secured on shafts 33 and 34 respectively arresting stops 35 and 36. The stops 35 and 36 as shown in FIGURES 2 and 6 extend downwardly to form lever arms 37 which are provided with bores adapted to receive shafts 38. The shafts 38, intermediate the spaced lever arms, are encompassed by eye 39 formed on the end of piston rod 40 of a cylinder 41 which may be energized in a well-known manner. As shown in FIGURES 1 and 4 the fixed and walking beams 10 and 11 are fabricated in left and right hand units which permits each pair of adjacent walking beams 11 to be tied together by spreaders 42 and 43 in order to stabilize the beams 11 against lateral deflection.

The operation of the unscrambler is as follows:

A bundle of billets is deposited by a crane or the like upon the receiving end of the unscrambler. The motor of the driving train 27 is energized and rotation is imparted to shaft 25. Rotation of shaft 25 imparts through the inter-connecting bearing 24 and pedestals 23, secured to the walking beam 11, a gyratory motion. Points on the walking beams forward of a perpendicular 44 erected through the rotational axis of the crankshafts describe a circular orbit. Points on the beam taken to the rear of the said line describe an ellipse. The minor axis of the ellipse diminishing as points are taken progressively rearwardly towards the receiving end of the unscrambler until a point adjacent to buttress 32 is reached. At this point the minor axis of the ellipse has vanished and the line described by the major axis inclines upwardly away from the fixed beam 10 at an acute angle. The acute angle of the major axis enclosed between the bisecting line of the ellipses and the top of the fixed beam 10 becoming more acute in the forward direction until the major axis coincides with the top plane of the fixed beam. The above motion of the walking beam 11 is accomplished by, as hereinbefore described, rotatably suspending the upper ends of links 18 upon shaft 17 secured to fixed beam 10 and the lower ends of the links are mounted in a rotatable manner upon shaft 20 secured to walking beam 11. Referring to FIGURE 10 which has plotted diagrammatically the orbits of points taken on the working surface of the walking beam 11 from the receiving end toward the delivery end. The cross A indicates the centre of the shaft 16, cross B indicating the axial centre of shaft 21, whilst the cross C depicts the rotational centre of the crankshaft 25. The point $a$, taken at the forward root of buttress 32, traces out a line which is upwardly inclined in a forward direction and is substantially a straight line. Points $b$, $c$, $d$, $e$, $f$, $g$, $h$, $i$, $j$, and $k$ are elliptical in configuration. The minor axis increasing in length as the reference points taken on the beam 10 progressively advance towards the delivery end of the beam 10. The angle of inclination of the major axis of the elliptical orbits with reference to the top planes of the fixed beam 10 increase in magnitude until said axis coincides with a perpendicular erected upon the forward planes of the beam 10. The orbital paths $l$, $m$ and $n$ of the reference points taken forward of the perpendicular 43 are substantially circular in configuration. The above described motion of the walking beam 11, between the points $a$ and $b$ at which the orbits are taken, imparts a slight lifting action on the deposited billets and at the same time carries them forward a distance equal to the throw of the crank. It will be appreciated that there is also set up in the bundle a rhythmic vibration which aids in the collapse of the bundle so that it will be more rapidly spread out along the beams 10 and 11. For purposes of clarifying and simplifying the description only that portion of the orbits utilized to perform movement of the billets will be henceforward referred to.

It will be appreciated that as the distance through which the bundle of billets is raised, from *a* to *n*, the angle of cant within the mass also increases thereby upsetting the stability of the superimposed billets causing them to slide one upon the other. This sliding action taken in conjunction with the vibration set up by the rhythmic movement of the walking beam 11 provides a force that breaks down the bundle. This breaking down action upon the bundle is further augmented by the sloped portions 45 and 46 on the fixed beams and sloped portions 47 and 48 on the walking beams 11 which are utilized to cause the superimposed billets to cascade downwardly from one land of the terrace to the lower land. This cascading of the billets also imparts a cant to the billets causing it to topple rearwardly against the sloped portion and subsequent movement of the walking beam 11 moves the billets forwardly in single file. If due to entanglement certain billets become disposed on the beams 10 in an angular position with regard to the longitudinal axis of the conveyor 30 the operator by energizing the appropriate cylinder 41 to retard the movement of the billet by erecting the claw associated with said cylinder until it has become aligned with the above mentioned axis. If on the other hand the flow of billets upon the unscrambler is in bunched formation or too rapid for unitary deposit on the conveyor he may restrain the flow by activating the forward or rearwardly disposed cylinders in pairs to bring the claws 35 and 36 into flow obstructing position. When the billets have advanced to the forward end of the lowermost terrace the sloped surface 49 of the V-notched portions 28 upon the initial upward movement of the beams 11 wedge the foremost billet forward until the zenith of the upward travel of the beam is reached. At this point in the beams travel the billet lodges in notch 50. Thence forward each cycle in the movement of the walking beam 11 advances the billets into the next preceding notch until a billet is deposited on the downwardly inclined nose portions 29 where they will slide downwardly and be deposited upon the live roller conveyor 30.

Referring to the series of FIGURES 11 the segregation and ultimate spacing of the billets upon the portion 28 of the fixed beam 10 is achieved in the following manner. Upon rotation of the crankshaft 25 and simultaneous movement of the walking beam 11, hereinafter referred to as a cycle, the leading two billets on land 51 are carried by the walking beam beyond the brink and as the walking beam recedes the billets slide down 45° incline 52 and are arrested by shoulder 53. The next cycle of rotation lifts the next succeeding two billets lodged upon plane 51 and continued forward travel of beam 11 brings incline 63 into contact with the two billets seated upon incline 52 forcing them beyond the apex of shoulder 53 thereby permitting the two advance billets to slide down incline 54, which is parallel to incline 52. The above described sequence of movements of the walking beam 11 has resulted in the placing of billets as shown in FIGURE 11. The subsequent portions of a working cycle, approximately one hundred degrees, results in the movement of bars as shown in FIGURES 11 through 11F. The first increment of movement brings plane 63 into contact first with billet 55, subsequently with billet 56, and then shoulder 57 impinges against billet 58 lifting it upwardly away from flank 59 of truncated tooth 60, nesting it against flank 61 of trauncated tooth 62 formed on walking beam 11. Continued rotation causes the walking beam to travel forward and up lifting billet 58 clear of the fixed beam, lifting and canting billet 56. Inclined surface 63 of walking beam, the angle of which is more acute, impinges against first billet 64 then billet 65 and eventually impinges against billet 66. At this point in the lifting cycle the billets shown are lifted clear of the fixed beam 10 and the upward travel of walking beam 11 has reached its zenith. The remaining portion of working cycle of crank rotation carries the walking beam forward and downwardly until billet 58 is resting upon flank 67 of tooth 68, billets 66 and 64 rest upon incline 54, billets 65 and 56 come to rest upon incline 52 and billet 55 is adjacent the inclined surface 52 upon plane 51. Referring to the series of FIGURES 12 through 12F it will be observed that the series of diagrams depict identical points selected during the working cycle of the crankshaft but the billets shown are of twice the dimensions to those shown and described in the series of FIGURES 11 and therefore the billets are segregated and move in the first phases as single units.

What we claim as our invention is:

1. An unscrambler device for obtaining any desired number of articles from a plurality thereof which comprises a pair of spaced fixed beams having the upper surfaces thereof in essentially the same horizontal plane and a walking beam adjacent said fixed beams mounted at the downstream end thereof for gyration in a vertical plane such that on gyration of said end the upper surface of the said walking beam rises above and descends below the upper surfaces of the fixed beams so as to move articles disposed on said fixed beams along said beams; means for gyrating the downstream end of said walking beam; each of said walking and fixed beams being provided on said upper surface with a cascade ending in a reverse slope forming a valley whereby at least one of the articles disposed in the valley in the fixed beams is picked up and carried in the valley on the walking beam and deposited on the downstream portion of the fixed beams, means being provided for moving further articles into the valley of the fixed beams.

2. A device as claimed in claim 1 in which the walking beam is mounted at the downstream end thereof for gyration in a vertical plane and suspended at the upstream end thereof for oscillation in a plane inclined at an acute angle in a downstream direction of the surface of the fixed beam.

3. A device as claimed in claim 2 in which the upstream end of said walking beam is suspended for oscillation by means of a linkage connected between the lower end of said walking beam and a horizontal shaft mounted between said fixed beams.

4. A device as claimed in claim 1 in which the downstream end of said moving beam is connected to an eccentrically mounted shaft for vertical gyration thereof.

5. A device as claimed in claim 1 in which the length of the cascade on the walking beam is greater than the length of the cascade on the fixed beam whereby on gyration of the walking beam the articles in the valley on the fixed beams are picked up and carried in the valley on the walking beam and at least one thereof deposited on the downstream portions of the fixed beams and at least one article adjacent and upstream of the valley on the fixed beam, picked up and carried in the valley on the walking beam and deposited in the valley on the fixed beams.

6. A device as claimed in claim 5 in which the reverse slope forms the upstream slope of a tooth on the upper edge of said beams.

7. A device as claimed in claim 6 in which the downstream slope of said tooth ends in a reverse slope forming a second valley, the length of the downstream slope of the tooth in the valley being less than the length of the cascade on the fixed beam such that a smaller number of articles may be selected than may be accommodated in said fixed beam cascades.

8. A unit as claimed in claim 7 whereby the length of said downstream slope is less than half the length of the fixed beam cascades.

9. A unit as claimed in claim 7 in which the reverse slope forms the upstream slope of a second tooth.

10. A unit as claimed in claim 9 in which the second tooth is truncated to reduce the height above the fixed beam necessary for the walking beam to rise.

11. A unit as claimed in claim 1 in which there are at least two walking beams acting in unison.

12. A unit as claimed in claim 1 in which the gradient of the cascade on the fixed beam is greater than the gradient of the cascade on the walking beam.

13. A unit as claimed in claim 1 in which the gradient of the fixed beams cascades 45° and that of the walking beam between 37° and 45°.

14. A unit as claimed in claim 1 in which the angle of the tooth is 45° for both slopes.

15. A unit as claimed in claim 9 in which the slope of the second tooth is 45° both surfaces.

References Cited by the Examiner
UNITED STATES PATENTS

| | | | |
|---|---|---|---|
| 2,748,635 | 6/1956 | Morgan | 198—219 |
| 2,995,235 | 8/1961 | Maier | 198—29 |

EVON C. BLUNK, *Primary Examiner.*

R. E. AEGERTER, *Assistant Examiner.*